United States Patent [19]

Holubka

[11] Patent Number: 4,486,571
[45] Date of Patent: Dec. 4, 1984

[54] EPOXY-MODIFIED POLYBUTADIENE CROSSLINKABLE RESIN COATING COMPOSITION

[75] Inventor: Joseph W. Holubka, Livonia, Mich.

[73] Assignee: Ford Motor Company, Dearborn, Mich.

[21] Appl. No.: 455,719

[22] Filed: Jan. 5, 1983

[51] Int. Cl.$^3$ .......................... C08F 8/00; C08L 63/00
[52] U.S. Cl. ................................ 525/110; 525/109; 525/113; 525/911
[58] Field of Search ................ 525/109, 110, 113, 911

[56] References Cited

U.S. PATENT DOCUMENTS

| | | |
|---|---|---|
| 3,250,734 | 5/1966 | Sekmakas . |
| 3,471,388 | 10/1969 | Koral .................... 204/181 |
| 3,678,130 | 7/1972 | Klapprott ............... 525/911 |
| 3,678,131 | 7/1972 | Klapprott ............... 525/911 |
| 3,823,107 | 7/1974 | Cotton et al. .......... 525/911 |
| 3,882,188 | 5/1975 | Behmel .................. 204/181 |
| 3,991,028 | 11/1976 | Irwin et al. ........... 204/181 |
| 4,026,855 | 5/1977 | Parekh et al. .......... 204/181 |
| 4,033,917 | 7/1977 | Sekmakas et al. ....... 204/181 |
| 4,057,523 | 11/1977 | Blank ..................... 204/181 |
| 4,072,536 | 2/1978 | Otsuki et al. .......... 106/252 |
| 4,159,233 | 6/1979 | Ting et al. ............. 204/181 |
| 4,182,831 | 1/1980 | Hicks ..................... 528/103 |
| 4,192,929 | 3/1980 | Wingfield .............. 525/110 |
| 4,192,932 | 3/1980 | Dickie et al. .......... 525/511 |
| 4,196,270 | 4/1980 | Chattha . |
| 4,202,746 | 5/1980 | Lee et al. . |

*Primary Examiner*—John C. Bleutge
*Assistant Examiner*—A. L. Carrillo
*Attorney, Agent, or Firm*—Peter D. McDermott; Roger L. May

[57] ABSTRACT

A novel crosslinkable coating composition suitable for use in cathodic electrodeposition of coating to retard corrosion of substrates is provided, which coating composition comprises:

A. crosslinkable resin, optionally at least partially neutralized, comprising the reaction product of:
  (a) substantially non-gelled epoxy-modified polybutadiene, comprising the reaction product of:
    (i) diamine functionalized polybutadiene reactant of number average molecular weight about 500 to about 5000; with
    (ii) monoepoxide reactant of number average molecular weight about 30 to about 500; and with
    (iii) diepoxide reactant of number average molecular weight about 100 to about 1000;

the diamine functionalized polybutadiene reactant bearing two secondary amine functionality and being reacted with said monoepoxide reactant and diepoxide reactant in relative molar ratio of about 1:0.9–1.1:0.9–1.1, respectively; with
  (b) di- or polyhydroxy compound of number average molecular weight about 50–500, said epoxy-modified polybutadiene being reacted with said di- or polyhydroxy compound in molar ratio of about 1:0.5 to about 1:2.0, respectively; and B. amino resin crosslinking agent reactive with the hydroxy functionality of said crosslinkable resin, in an amount of about 5%–60% by weight of the crosslinkable resin.

20 Claims, No Drawings

EPOXY-MODIFIED POLYBUTADIENE CROSSLINKABLE RESIN COATING COMPOSITION

TECHNICAL FIELD

This invention relates to novel coating compositions comprising epoxy-modified polybutadiene resins and relates to the use of such coating composition to prevent corrosion of substrates such as ferris metal substrates and the like. According to a preferred embodiment, this invention relates to water dispersable non-gelled epoxy-modified polybutadiene resins and to aqueous coating compositions comprising such resins together with suitable crosslinking agent from which corrosion resistant coatings can be electrodeposited onto a cathodically charged substrate.

RELATED APPLICATIONS

This application is related to concurrently filed application Ser. Nos. 455,678, 455,718, 456,067, 456,068 and 458,119.

BACKGROUND ART

Coating compositions are know which are suitable for application to a substrate, for example, by spraying, dipping, electrodeposition or the like, which coating compositions are then cured by baking the coated substrate at an elevated temperature. Typically, such coating compositions comprise resinous materials or blends of resinous materials together with suitable crosslinking agent reactive with such resinous materials at elevated temperature.

In regard to electrodeposition of coatings, the process is well described in the art. Typically, an aqueous bath containing the coating composition is placed in contact with an electrically conductive anode and an electrically conductive cathode, and upon the passage of electric current (normally direct current) between the anode and the cathode while in contact with the bath containing the coating composition, an inherent film of the coating composition is deposited. Depending upon the nature of the coating composition, the coating may be deposited at the anode or at the cathode. The process parameters vary widely. The voltage applied may vary from as low as, for example, about one volt to as high as, for example, 500 volts or higher. Typically, however, the voltage used ranges from about 50 to about 400 volts.

A wide variety of electrodepositable resins are known to the skilled of the art. For example, a number of water-soluble, water-dispersable, or water-emulsifiable polycarboxylic acid resins can be electrodeposited. Such resins include, for example, reaction products or adducts of a drying oil or semi-drying oil fatty acid ester with a dicarboxylic acid or anhydride; interpolymers of a hydroxyalkyl ester of an unsaturated carboxylic acid, unsaturated carboxylic acid, and at least one other ethylenically unsaturated monomer; alkyd-amine vehicles, that is vehicles containing an alkyd resin and an amine-aldehyde resin; and mixed esters of resinous polyols. In U.S. Pat. No. 3,991,028 to Irwin et al, electrodepositable compositions are disclosed which comprise a water-dispersion of a hydrolyzed polyepoxide in combination with an interpolymer of a hydroxyalkyl ester, an unsaturated acid and at least one other monomer, and an amine-aldehyde resin. The use of a hydrolyzed polyepoxide is said to provide improved properties and to avoid agglomeration of the coating composition. In U.S. Pat. No. 4,026,855 to Parekh et al a coating composition is disclosed which is said to be adaptable for use in electrodeposition or as a water-based coating for application by spray or dip coating methods. The composition comprises an aqueous dispersion of (A) an ungelled modified crosslinking agent comprising certain aminoplast crosslinking agent that has been modified by reaction with a non-resinous hydroxyl-group containing carboxylic acid, and (B) a water-dispersable non-gelled polymeric material carrying a cationic charge and containing amino groups and at least one class of reactive groups selected fom carboxyl groups, alcoholic hydroxy groups and amide groups, and (C) an acid solubilizer. U.S. Pat. No. 4,033,917 to Sekmakas et al discloses certain copolymers of polyethylenically unsaturated epoxy-amine adducts and also stable aqueous dispersions containing same and also the electrodeposition of such aqueous dispersions at the cathode of a unidirectional electrical system. Specifically, amine functional polymers dispersable in water with the aid of a solublizing acid are said to be provided by copolymerizing (A) certain ethylenically unsaturated hydroxy functional amine adduct free of epoxy groups, and (B) copolymerizable monoethylenically unsaturated monomers, a portion of which is amine-functional. The copolymer is said to be dispersable in water at certain pH and to be electrodepositable at the cathode, optionally together with an aminoplast curing agent to provide coatings which can be cured usually by exposure to elevated temperature. U.S. Pat. No. 3,471,388 to Koral is directed to a cathodic electrocoating composition which incorporates an aminoplast crosslinker with any of several disclosed resins. One disclosed resin is an aminated polymer containing hydroxy groups. Numerous suitable hydroxy-containing aminated polymers are suggested which have capability to crosslink with an aminoplast crosslinking agent. One such suggested polymer is the reaction product of a poly-functional amine with a poly-functional epoxy compound. The polyhydroxy polymers are said to be disperable in water upon addition of suitable acid such as acetic acid. Additional related teaching directed to coating compositions suitable for use in electrocoating processes is provided in U.S. Pat. No. 4,159,233 to Ting et al; U.S. Pat. No. 4,057,523 to Blank; U.S. Pat. No. 4,182,831 to Hicks; U.S. Pat. No. 4,192,932 to Dickie, which patent is assigned to the assignee of the present application; U.S. Pat. No. 4,192,929 to Bloomfield, which patent is assigned to the assignee of the present application; U.S. Pat. No. 4,202,746 to Lee et al; and U.S. Pat. No. 4,072,536 to Otsuki et al.

It is a primary objective of the present invention to provide a crosslinkable polymeric resin and a crosslinkable coating composition comprising same. In this regard, it is one particular object of the invention to provide a crosslinkable coating composition adapted for use in primer compositions such as a primer composition for an automotive vehicle body, to effectively retard corrosion of the underlying substrate. It is particularly an objective of the invention to provide such corrosion protection without the use of chromate pigments.

One particular objective of the invention is to provide a crosslinkable coating composition comprising an aqueous dispersion of such crosslinkable resin for use in the electrodeposition of coatings onto electrically conductive substrates. In this regard, it is a particular objective to provide coating compositions adapted for use in cathodic electrocoating processes. Additional objects and aspects of the invention will be apparent from the following description thereof.

DISCLOSURE OF THE INVENTION

The present invention provides novel polymeric materials that are particularly useful together with suitable crosslinking agent in coating operations, including electrocoating operations. The compositions of the invention may also be used in the manufacture of low pressure laminates, adhesives, molding compounds and textile treating resins. The compositions of the present invention are particularly adaptable for use in cathodic electrodeposition operations to provide a corrosion resistant primer coating on automotive vehicle body panels. The compositions of the present invention can also be employed as water-based coatings suitable for application by spray or dip techniques and for like applications.

Accordingly, this invention provides a novel crosslinkable coating composition, especially adapted for use in primer compositions that retard corrosion of corrosion susceptable substrates, which coating composition comprises:

A. a crosslinkable resin, optionally at least partially neutralized, comprising the reaction product of:
  (a) substantially non-gelled epoxy-modified polybutadiene, comprising the reaction product of:
    (i) diamine functionalized polybutadiene reactant of number average molecular weight about 500 to about 5000; with
    (ii) monoepoxide reactant of number average molecular weight about 30 to about 500; and with
    (iii) diepoxide reactant of number average molecular weight about 100 to about 1000;
  the aforesaid diamine functionalized polybutadiene reactant, monoepoxide reactant and diepoxide reactant being reacted in molar ratio of about 1:.04–.06:.04–.06, respectively, such that the epoxy-modified polybutadiene reaction product comprises, on average, about one epoxide functional group per molecule; with
  (b) a di- or polyhydroxy compound of number average molecular weight about 50–500; and
B. an amino resin crosslinking agent reactive with the hydroxy functionality of the aforesaid crosslinkable resin, in an amount of about 5%–60% by weight of such crosslinkable resin.

The diamine functionalized polybutadiene reactant has two secondary amine functionality, preferably two terminal secondary amine functionality.

The crosslinkable resin of the invention is preferably of number average molecular weight about 700–10,000. For use in solvent-based spray primers, for example, the crosslinkable resin is preferably of number average molecular weight about 700–3,000. According to one preferred embodiment, the invention provides an aqueous dispersion of a mixture comprising the above-described crosslinkable resin substantially completely neutralized with a suitable solubilizing acid such as acetic acid. The coating composition according to this embodiment of the invention is particularly adapted for use in cathodic electrocoating processes. For use in such electrodeposition composition, the crosslinkable resin is preferably of number average molecular weight about 2,000–7,000.

According to another aspect of the invention, a method of making a corrosion, solvent and humidity resistant coating on a substrate comprises applying to the substrate the novel thermosetting coating composition of the invention and subsequently subjecting the coating to an elevated temperature for a time period sufficient to substantially cure the coating composition. According to such method, the above-described thermosetting coating composition is applied to the substrate, for example, a bare metal surface and subsequently heated to a curing temperature at which the polymeric resin undergoes crosslinking reaction with the crosslinking agent. It has been found that the cured coatings produced by the invention are exceptionally resistant to solvents and humidity and provide exceptionally effective corrosion protection for the underlying substrate. In addition, the coatings have been found to provide exceptionally good flow properties and, consequently, provide aesthetically superior coatings. With regard to the use of the present invention in electrodeposition processes, it has been discovered that the crosslinkable resin can be dispersed easily into water to give highly stabled dispersions adapted for use as cathodic electrocoating compositions.

Other features and advantages will become more apparent from the following detailed description including the preferred embodiments and best mode of the invention.

DETAILED DESCRIPTION OF THE INVENTION

The coating composition of the present invention comprises, as a first essential component, component (A) above, a crosslinkable polymeric resin comprising the reaction product of a substantially non-gelled epoxy-modified polybutadiene with a di- or polyhydroxy compound. The epoxy-modified polybutadiene is the reaction product of (i) diamine functionalized polybutadiene reactant of number average molecular weight about 500 to about 5000; with (ii) monoepoxide reaction of number average molecular weight about 30 to about 500 more preferably about 50 to about 250; and with (iii) diepoxide reactant of number average molecular weight about 100 to about 1000 more preferably about 100 to about 500. The diamine functionalized polybutadiene, that is, the polybutadiene bearing two secondary amine functionality, can be prepared according to methods well known to the skilled in the art, for example as the copolymerization reaction product of butadiene with acrylonitrile followed by subsequent partial reduction of the nitrile functionality. Additional suitable methods of preparing the diamine functionalized polybutadiene will be apparent to the skilled of the art in view of the present disclosure. In addition, any of several commercially available diamine functionalized polybutadienes can be employed. Thus, for example, the amine terminated polybutadiene available from B. F. Goodrich Chemical Division, Cleveland, Ohio under the trademark HyCAR 1300×21 ATBN, a polybutadiene acrylonitrile copolymer containing 10% acrylonitrile and having a total amine equivalent weight of 12000 can be used and is preferred among the commercially available diamine functionalized polybutadienes. Also suitable is HyCAR 1300×16 ATBN, a polybutadiene acrylonitrile copolymer having 16% acrylonitrile and having a total amine equivalent weight of 900.

Suitable monoepoxide reactants include many commercially available materials well known to the skilled of the art. Preferably the monoepoxide reactant is of lower number average molecular weight about 50 to about 250, since lower molecular weight monoepoxide reactants are found to be more reactive and also to increase more the polarity of the final resin. Such preferred monoepoxide reactants include, for example, phenyl glycidyl ether, which is most preferred, ethylene oxide, propylene oxide, cyclohexene oxide and the like or a compatable mixture of any of them. Additional suitable monoepoxide reactants will be apparent to the skilled of the art in view of the present disclosure.

Suitable diepoxide reactants include numerous commercially available materials well known to the skilled of the art such as, for example, any of a wide variety of acyclic or cyclic aliphatic diepoxides and aromatic diepoxides or a compatable mixture of any of them. Preferably the diepoxide is a terminal diepoxide, that is, a diepoxide bearing two terminal epoxide groups, since these are generally more reactive and so require milder reaction conditions. Most preferred in view of their commercial availability are, for example, 1,4-butanediol diglycidyl ether, 4-vinylcyclohexene dioxide, Bisphenol A epichlorohydrin epoxy resins and the like or a compatable mixture of any of them. Suitable commercially available diepoxides include, for example, aromatic diepoxides such as Epon 828 (trademark) and other members of the Epon (trademark) series, Shell Chemical Company, Houston, Texas (Bisphenol A epichlorohydrin epoxy resins); DER 331 (trademark) and other members of the DER (trademark) series, Dow Chemical Company, Midland, Michigan (Bisphenol A epichlorohydrin epoxy resins); and cycloaliphatic diepoxide resins such as the Eponex (trademark) series, Shell Chemical Company, Houston, Texas; and hydantroin epoxy resins such as Resin XB2793 (trademark), Ciba-Geigy Corporation, Ardsley, New York. In general, lower molecular weight diepoxides are preferred since a resin composition of corresponding lower viscosity is provided. In some instances, however, improved properties, for example, improved corrosion resistance may be achieved with coating compositions of higher viscosity and the choice of suitable diepoxide and also the choice of suitable monoepoxide and diamine functionalized polybutadiene will depend upon the particular application intended for the coating composition.

The diamine functionalized polybutadiene reactant, monoepoxide reactant and diepoxide reactant are reacted, preferably, in molar ratio of about 1 : .9–1.1 : .9–1.1, respectively. Preferably they are used in molar equivalent ratio of about 1 : 1 : 1. The diamine functionalized polybutadiene reactant can be reacted with the monoepoxide reactant and the diepoxide reactant either simultaneously or, preferably, sequentially. Specifically, it is preferred that the diamine functionalized polybutadiene reactant be reacted first with the monoepoxide reactant free of the diepoxide reactant. Such reaction is carried out most preferably according to methods well known to the skilled of the art to react each monoepoxide molecule with a different diamine functionalized polybutadiene molecule. Subsequently, the product of that intermediate reaction is reacted with the diepoxide reactant. While not wishing to be bound by theory, it is presently understood that the monoepoxide reacts with a first secondary amine functionality of the diamine functionalized polybutadiene reactant and that one of the two epoxide functionalities of the diepoxide then reacts with the second secondary amine functionality of the diamine functionalized polybutadiene reactant. The reaction product thus provides an unreacted epoxy functional group. While, no doubt, a mixed reaction product is obtained, the skilled in the art will recognize that the proportion of the reaction product just mentioned will be optimized according to the preferred embodiment of the invention wherein the diamine functionalized polybutadiene is first reacted with monoepoxide alone, the diepoxide being added subsequently.

The crosslinkable resin employed in the coating composition of the present invention comprises the reaction product of the epoxy-modified polybutadiene reaction product described above with a di- or polyhydroxy compound. The reaction is carried out according to techniques well known to the skilled of the art. Suitable dihydroxy materials include any of a wide variety of readily commercially available materials known to the skilled of the art. Preferred dihydroxy materials include those of molecular weight of about 50 to about 500, more preferably about 80 to about 250. Preferred aliphatic dihydroxy compounds include, for example, those of a 2 to 20 carbons, for example, ethylene glycol, propanediol, butanediol, pentanediol and the like or a mixture of any of them. Most preferred are terminal dihydroxy compounds, that is dihydroxy compounds bearing two terminal hydroxy functionality, for example, 1,6-hexanediol, 1,3-propanediol, and 1,4-butanediol, 1,5-pentanediol, 2-ethyl-1,3-hexanediol, triethylene glycol and the like or a compatable mixture of any of them, since these are generally more reactive and are believed to provide crosslinkable resin products having less stearically hindered hydroxy crosslinking functionality. Suitable aromatic dihydroxy compounds include those wherein one or both hydroxy groups are substituted on a benzene ring. Preferred aromatic dihydroxy compounds include those wherein two hydroxy groups are substituted on different benzene rings linked through a covalent bond of through one or more carbons of a one to seven carbon, preferably three to five carbon, aliphatic moiety. Exemplary aromatic dihydroxy compounds include Bisphenol A, Bisphenol B, catechol and the like or a compatable mixture of any of them.

Polyhydroxy compounds having three or more, preferably having three to ten hydroxy groups per molecule, can be reacted with the epoxy-modified polybutadiene compound in place of or in addition to the dihydroxy reactant described above. Generally, triol reactants are most preferred. The polyhydroxy reactant preferably has a number average molecular weight between about 200 and about 1000, more preferably between about 200 and about 700. Numerous such polyhydroxy reactants are readily commercially available and well known to the skilled of the art. Exemplary polyhydroxy reactants include polyhydroxy functional straight or branched chain saturated or unsaturated hydrocarbons, optionally comprising one or more oxy or ester moieties and optionally comprising one or more aromatic and/or heterocyclic rings, the heterocyclic atom(s) being selected preferably from N, O and S. Suitable polyhydroxy reactants include, for example, trimethylol propane which is most preferred, gylcerine, triethanolamine, and the like or a compatable mixture of any of them. Additional suitable polyhydroxy reactants will be apparent to the skilled of the art in view of the present disclosure.

The skilled of the art will understand that the reaction of the free epoxide groups of the epoxy-modified polybutadiene compound with an hydroxy group of the di- or polyhydroxy compound increases the crosslinking functionality of the crosslinkable polymeric resin reaction product, which is employed in the coating composition of the invention. More specifically, the one or more hydroxy groups of the di- or polyhydroxy compound which remain unreacted following the reaction of the di- or polyhydroxy compound with the epoxy-modified polybutadiene compound are available for subsequent crosslinking reaction with the crosslinking agent at elevated temperature during cure of the coating on the substrate. It will be apparent to the skilled of the art that proper selection of the di- or polyhydroxy reactant can be used to control the molecular weight of the crosslinkable resin of the coating composition and thus can be used to determine in large measure the viscosity and other properties of the coating composition. Likewise, for example, it will be understood that selection of a polyhydroxy reactant having a larger number of hydroxy groups will ultimately result in a more highly crosslinked cured coating (assuming use in the coating composition of a stoichiometric amount of crosslinking agent). Use of a dihydroxy reactant or of a polyhydroxy reactant having few hydroxy groups will result in a cured coating having a lower crosslink density. Preferably, a stoichiometric amount of di- or polyhydroxy reactant is reacted with the epoxy-modified polybutadiene. That is, preferably, sufficient di- or polyhydroxy reactant is used to react with all available epoxy groups of the epoxy- modified polybutadiene reactant. Ultimately, the choice of most favored di- or polyhydroxy reactant and the choice of epoxy-modified polybutadiene reactant (and of the amine terminated polybutadiene, monoepoxide and diepoxide reactants employed in preparing the epoxy-modified polybutadiene) will depend, in part, upon the particular application intended for the coating composition and will be within the ability of those skilled in the art in view of the present disclosure.

Suitable crosslinking agents for use with the crosslinkable resin in the coating composition of the invention include numerous commercially available crosslinking agents well known to the skilled of the art. Such crosslinking agents include, for example, any of a variety of aminoplast crosslinking agents, for example, partially alkylated melamines (melamine formaldehyde resins modified by alcohols), for example partially methylated melamines and butylated melamines; polyalkyl ethers of the polymethylol melamines, for example, hexamethoxymethyl melamine; urea formaldehyde condensate modified by alcohol, for example, butylated urea resin; polymerides of formaldehyde, for example, paraformaldehyde and trioxane; polymethylol compounds of hexamethylene diurea; adipic acid dimethylol amide and methylol ether thereof; and the like or a compatable mixture of any of them. Other suitable crosslinking agents will be apparent to the skilled of the art in view of the present invention. In general, hexamethoxymethyl melamine is preferred since it is readily commercially available, is of low molecular weight, and has been found to provide suitable crosslinking activity. The proper proportion of crosslinking agent in the coating composition will depend upon the properties desired in the coating to be produced. Generally, a somewhat less than stoichiometric amount of crosslinking agent can be used to provide a cured coating of greater flexibility. An excessive relative amount of crosslinking agent can produce a coating which is more brittle and humidity sensitive. If too little crosslinking agent is used, the coating may not cure properly. Where hexamethoxymethyl melamine or the like is employed with a preferred crosslinkable resin as described above, a generally preferred weight ratio of crosslinking agent to resin is from about 10 : 90 to about 50 : 50, more preferably about 20 : 80 to about 80 : 30, respectively.

Also preferably included in the coating composition of the invention is any of a variety of acid catalysts known to the skilled of the art to catalyze the crosslinking reaction, for example, paratoluenesulfonic acid, phosphoric acid, phenol acid phosphate, butyl maleate and the like or a compatable mixture of any of them. In addition, a flow control agent, for example, polybutylacrylate; a wetting agent, for example, silicone; pigments; a pigment dispersant; and a corrosion inhibitor, for example, chromate pigment, all of which are known to the skilled of the art, may be employed in the coating composition of the invention.

The crosslinkable coating compositions of the invention can be employed for any of a variety of coating applications. As noted above, however, the coating compositions are most advantageously used as a primer formulation which can be either water-based or non-water-based. Such primer formulations can be used as coatings for bare or treated steels (e.g., conversion coated with phosphates) as well as for guide coats over previously deposited primers. Accordingly, the coating composition of the invention can be formulated as a hydrocarbon solvent based primer suitable for spray application to metal substrates according to well known techniques. It will be within the ability of those skilled in the art to determine a suitable solvent and amount of same for a given application. It will be understood that any solvent allowed to remain in the cured coating should be inert so as to avoid adverse effects upon the cured coating or upon another coating used in conjunction with it, during the curing process or thereafter. Preferably, the cured coating is completely free of solvent. Sufficient solvent is used to reduce the viscosity of the coating composition to a level suitable for application to the substrate in the desired manner. Thus, for example, for coatings to be used as a spray-applied primer coating composition, it is preferred that sufficient solvent be used to reduce the viscosity of the coating composition to about 25-35 seconds, #4 Ford Cup at 27° C. (80° F.). Hydrocarbon solvent based coatings according to the present invention, having a viscosity within such preferred range are cured by exposure to elevated temperature for a time sufficient to drive off the solvent and to cause the crosslinking/chain extension reactions to proceed. Typically, baking the coated substrate at a temperature of at least abot 150° C., more preferably about 165° C.-210° C., for a period of about 10-60 minutes, more preferably about 20-30 minutes is sufficient to cure the coating.

According to a more preferred embodiment of the invention, the coating composition is formulated as a water-based primer. Water-based primers according to the invention comprise the above-described mixture of crosslinkable resin, crosslinking agent, and acid catalysts and other optional agreements, if any. This mixture is then at least partially neutralized, preferably substantially totally neutralized, by addition of suitable solubilizing acid, many of which are commercially available and well known to the skilled of the art, such as, for example, acetic acid which is most preferred, lactic acid, propionic acid or the like or a compatable mixture of any of them. It has been found that resin mixtures according to the invention so neutralized are readily dispersable into water, preferably de-ionized water, to give highly stable dispersions suitable for the use either in spray application methods or, more preferably, electrodeposition methods. Cured coatings resulting from such methods are found to provide exceptionally good flow characteristics resulting in smooth and otherwise aesthetically advantageous films having exceptionally good solvent and humidity resistance. The cured coatings are also found to be highly alkali resistant and thus provide exceptionally good corrosion protection to the underlying substrate.

The method of the invention wherein the crosslinkable coating composition is applied to a surface of a substrate by electrodeposition technique is an especially preferred embodiment of the invention. According to this embodiment, the crosslinkable coating composition is at least partially neutralized, preferably substantially totally neutralized, as described above, and thereafter dispersed into de-ionized water to a concentration of about 5–20 weight percent, more preferably about 10–15 weight percent. The resulting water-based composition is adapted for use as a cathodic electrocoat compositon. That is, the coating comprising the crosslinkable resin, crosslinking agent and catalyst etc., if any, will deposit upon the workpiece acting as the cathode according to known electrodeposition systems and techniques. The cathodic electrodeposition is done preferably at voltages of about 1–500 volts, more preferably about 200–350 volts. Subsequent to electrodeposition, the coating on the substrate is heated to above about 150° C., more preferably about 165° C.-210° C. for a time sufficient to effect the crosslinking reaction and to drive off substantially the entire water content of the coating. Typically, the coating will be substantially completely cured following baking at about 160° C. for about 30 minutes. In general, it will be within the ability of those skilled in the art to select suitable electrodeposition voltages and baking temperatures and like process parameters in view of the particular application involved.

The invention will be further understood by referring to the following detailed examples. It should be understood that these examples are presented by way of illustration and not by way of limitation. Unless otherwise specified, all references to "parts" are intended to mean parts by weight.

EXAMPLE I

A heat curable coating composition according to the invention, suitable for use as a cathodic electrodeposition primer for application to bare steel automotive vehicle body panels was prepared as follows.

Part A—Preparation of Epoxy-modified Polybutadiene Crosslinkable Resin

A substantially gell-free epoxy-modified polybutadiene was prepared by heating a mixture of 250 g HyCar 1300 ×21 (trademark) secondary amine terminated polybutadiene available from B. F. Goodrich Chemical Division, Cincinnati, Ohio, with 188 g phenyl glycidyl ether at about 110°–130° C. After 30 minutes, 25.3 g of 1,4-butane diol diglycidyl ether is added and heating is continued for 30 minutes. The epoxy-modified polybutadiene resin so prepared was combined with 22.5 g of trimethylol propane and heated for 110°–130° C. for 4 hours. The resulting resin was thinned with 20 g hexyl Cellosolve and then was maintained at 110°–130° C. for an additional 16 hours.

Part B—Preparation of Clear Dispersion

A clear dispersion (unpigmented) suitable for use in the preparation of a fully formulated electrocoat primer is prepared by combining 33.7 g of the product of Part A of this example with 12.0 g of butylated melamine (80% solids), 5.4 g hexyl Cellosolve, 0.5 g glacial acetic acid in 50 g deionized water. The resulting mixture is then dispersed into 20.0 g deionized water affording a somewhat milky dispersion.

Part C—Preparation of Mill Base

A mill base suitable for use in pigmenting an electrodepositable primer was prepared by grinding pigments (5 g carbon black, 5 g silicon, 5 g $TiO_2$, and 15 g Barytes) in 60 g butylated melamine (80% solids) and 27 g hexyl Cellosolve until a Hegman Gauge reading of 7 was achieved.

Part D—Preparation of Fully Formulated Electrocoat Primers

A fully formulated primer was prepared by combining 33.7 g of the epoxy-modified polybutadiene crosslinkable resin prepared in Part A of this example, with 20.4 g of mill base (containing crosslinking agent) in 0.5 g glacial acetic acid and 80 g deionized water. The resulting solution was then dispersed into 200 g deionized water while maintaining a temperature of 60° C. Finally, the fully formulated electrocoat primer was prepared by adding the clear dispersion prepared in Part B of this example and then filtering the the resulting composition.

EXAMPLE II

The coating composition prepared in Example I was employed to coat phosphated steel panels in a cathodic electrocoating process. The inch panels were immersed in the coating composition. A coating is deposited by cathodic electrodeposition at 300 volts. The panels are removed from the coating composition bath and baked at 180° C. for 30 minutes. The result was a smooth film having excellent solvent resistance, as tested by exposure to xylene solvent, and excellent flexibility and hardness. The coatings are found by standard salt spray test to provide excellent corrosion protection to the underlying steel substrate.

In view of this disclosure, many modifications of this invention will be apparent to those skilled in the art. It is intended that all such apparent modifications fall within the true scope of this invention and be included within the terms of the appended claims.

Industrial Applicability

It will be apparent from the foregoing that this invention has industrial applicability as a coating composition, especially as a cathodic electrocoat primer formulation for sheet steel and like substrates, for example, automotive vehicle body panels, household appliance housings and the like. Additional applications will be apparent to the skilled of the art in view of the foregoing disclosure.

I CLAIM:
1. A coating composition comprising:
A. crosslinkable resin, optionally at least partially neutralized, comprising the reaction product of:
   (a) substantially non-gelled epoxy-modified polybutadiene, comprising the reaction product of:

(i) diamine functionalized polybutadiene reactant of number average molecular weight about 500 to about 5000; with (ii) monoepoxide reactant of number average molecular weight about 30 to about 500; and with (iii) diepoxide reactant of number average molecular weight about 100 to about 1000;

said diamine functionalized polybutadiene reactant bearing two secondary amine functionality and being reacted with said monoepoxide reactant and with said diepoxide reactant in molar ratio of about 1 : 0.9–1.1 : 0.9–1.1, respectively; with (b) di- or polyhydroxy compound of number average molecular weight about 50–500, said epoxy-modified polybutadiene being reacted with said di- or polyhydroxy compound in molar ratio of about 1:0.5 to about 1:2.0, respectively; and B. amine-aldehyde resin crosslinking agent reactive with hydroxy functionality of said crosslinkable resin, in an amount of about 5%–60% by weight of said crosslinkable resin.

2. The coating composition of claim 1, wherein said diamine functionalized polybutadiene bears two terminal secondary amine functionality.

3. The coating composition of claim 1, wherein said diamine functionalized polybutadiene is reacted first with said monoepoxide free of said diepoxide.

4. The coating composition of claim 1, wherein said monoepoxide reactant is selected from the group consisting of phenyl glycidyl ether, ethylene oxide, propylene oxide, cyclohexene oxide and a compatible mixture of any of them.

5. The coating composition of claim 1, wherein said diepoxide reactant is selected from the groups consisting of of 1,4-butane diol diglycidyl ether 4-vinylcyclohexene dioxide, Bisphenol A epichlorohydrin epoxy resin and a compatible mixture of any of them.

6. The coating composition of claim 1, wherein said crosslinkable resin comprises the reaction product of said epoxy-modified polybutadiene with reactant selected from the group consisting of trimethylol propane, glycerine, triethanolamine, ethylene glycol, propanediol, butanediol, pentanediol, hexanediol, triethylene glycol and a compatible mixture of any of them.

7. The coating composition of claim 1, wherein said crosslinkable resin is substantially completely neutralized with solubilizing acid selected from the group consisting of acetic acid, lactic acid, propionic acid and a compatible mixture of any of them.

8. The coating composition of claim 1, further comprising acid catalyst in amount effective at elevated temperature to substantially catalyze crosslinking reaction of said crosslinkable resin and said crosslinking agent.

9. The coating composition of claim 8, wherein said acid catalyst is selected from the group consisting of paratoluenesulfonic acid, phosphoric acid, phenyl acid phosphate, butyl maleate and a compatible mixture of any of them.

10. A coating composition adapted for use in electrodeposition of primer coatings that retard corrosion of corrosion susceptible substrates, which coating composition comprises an aqueous dispersion of:

A. crosslinkable resin of number average molecular weight about 2000–7000, substantially completely neutralized with solubilizing acid selected from the group consisting of acetic acid, lactic acid, propionic acid and a compatible mixture of any of them, comprising essentially the reaction product of:

(a) substantially non-gelled epoxy-modified polybutadiene comprising the reaction product of (i) 1,4-butanediol diglycidyl ether in approximately 1 : 1 molar ratio with (ii) the reaction product of diamine functionalized polybutadiene of number average molecular weight of about 2000 to about 7000, in approximately 1 : 1 molar ratio with phenyl glycidyl ether, with (b) trimethylol propane, said epoxy-modified polybutadiene and trimethylol propane being reacted in approximately 1 : 1 molar ratio;

B. amine-aldehyde resin crosslinking agent reactive with the hydroxy functionality of said crosslinkable resin, in an amount of about 5%–60% by weight of said crosslinkable resin; and C. catalyst selected from the group consisting of paratoluenesulfonic acid, phosphoric acid, phenyl acid phosphate, butyl maleate and a compatible mixture of any of them.

11. The coating composition of claim 10, wherein said amine-aldehyde resin crosslinking agent consists essentially of butylated melamine.

12. A method of retarding corrosion of corrosion susceptible substrates, which method comprises:

I. applying to the substrate a coating composition comprising:

A. crosslinkable resin, optionally at least partially neutralized, comprising the reaction product of:

(a) substantially gel-free epoxy-modified polybutadiene reactant comprising the reaction product of:

(i) diamine functionalized polybutadiene reactant of number average molecular weight about 500 to about 5000; with (ii) monoepoxide reactant of number average molecular weight about 30 to about 500; and with (iii) diepoxide reactant of number average molecular weight about 100 to about 1000;

said diamine functionalized polybutadiene rectant bearing two secondary amine functionality and being reacted with said monoepoxide reactant and diepoxide reactant in molar ratio of about 1:0.9–1.1:0.9–1.1, respectively; with (b) di- or polyhydroxy compound of number average molecular weight about 50–500, said epoxy-modified polybutadiene being reacted with said di- or polyhydroxy compound in molar ratio of about 1:0.5 to about 1:2.0, respectively; and B. amine-aldehyde resin crosslinking agent reactive with hydroxy functionality of said crosslinkable resin, in an amount of about 5%–60% by weight of said crosslinkable resin; and II. heating said coating composition at about 150° C. to about 210° C. for a time sufficient to cure same.

13. The method of claim 12, wherein said diamine functionalized polybutadiene bears two terminal secondary amine functionality.

14. The method of claim 12, wherein said diamine functionalized polybutadiene is reacted first with said monoepoxide free of said diepoxide.

15. The method of claim 12, wherein said monoepoxide reactant is selected from the group consisting of phenyl glycidyl ether, ethylene oxide, propylene oxide, cylclohexene oxide and a compatible mixture of any of them.

16. The method of claim 12, wherein said diepoxide reactant is selected from the group consisting of 1,4-butane diol diglycidyl ether, 4-vinylcyclohexene dioxide, Bisphenol A epichlorohydrin epoxy resin and a compatible mixture of any of them.

17. The method of claim 12, wherein said crosslinkable resin comprises the reactant product of said epoxy-modified polybutadiene with reactant selected from the group consisting of trimethylol propane, glycerine, triethanolamine, ethylene glycol, propanediol, butanediol, pentanediol, hexanediol, triethylene glycol and a compatible mixture of any of them.

18. The method of claim 12, wherein said crosslinkable resin is substantially completely neutralized with solubilizing acid from the group consisting of acetic acid, lactic acid, propionic acid, and a compatible mixture of any of them.

19. The method of claim 12, wherein said coating composition further comprises acid catalyst in amount effective at elevated temperature to substantially catalyze crosslinking reaction of said crosslinkable resin and said crosslinking agent.

20. The method of claim 19, wherein said acid catalyst is selected from the group consisting of paratoluenesulfonic acid, phosphoric acid, phenyl acid phosphate, butyl maleate and a compatible mixture of any of them.

* * * * *